Patented July 7, 1936

2,046,971

UNITED STATES PATENT OFFICE 2,046,971

PROCESS FOR THE PURIFICATION OF ASBESTOS

Ernst Schürmann, Steglitz, near Berlin, and Wilhelm Esch, Schoeneberg, near Berlin, Germany No Drawing. Application May 9, 1935, Serial No. 20,610. In Germany May 23, 1934

3 Claims. (Cl. 252—8)

Our invention relates to a process for the purification of asbestos. For many years it has been stated by the electric industry dealing with asbestos that the heating wires wrapped with asbestos and used in electric devices, such as heating pillows, were subject to corrosions the causes of which were unknown. The frequent fires produced by this phenomenon led to an extensive investigation into the reasons therefore and eventually to the provision of a process by which it could be prevented.

As has been irrefutably determined that the metal corrosion observed by the industry is not a consequence of the water-soluble chlorides or sulphates of the alkalies and alkaline earths present in every asbestos but that the presence of small amounts of pyrite is responsible for the said corrosions.

The problem now consisted in completely destroying these dangerous impurities without the properties of the asbestos being adversely affected by such treatment.

The methods per se known for the decomposition of pyrite cannot be used in the present instance as by their use the asbestos itself is destroyed or the substances used are absorbed to such a degree by the asbestos fibres that they are not susceptible of being integrally removed therefrom by washing.

It was stated that the solution of this problem is successful when compressed oxygen or compressed air is caused to act under suitable conditions for reaction on the asbestos containing those injurious components. This treatment incidently also results in the removal of a part of the above mentioned water-soluble impurities of the asbestos.

In order that the pyrite is destroyed the asbestos is treated under increased pressure and at an increased temperature with a mixture of oxygen or air and saturated steam. The presence of saturated steam cannot be dispensed with in order that the asbestos does not lose its water chemically combined which ensures the valuable physical properties of the asbestos, such as ductility, tensile strength and susceptibility of spinning. Therefore care must be taken that for the obtention of this effect an excess amount of water is provided for from the start in the reaction vessel. Further the temperature and the pressure are to be controlled suitably in order that the pyrite impurities are thoroughly oxidized.

The use of compressed oxygen or compressed air as an oxidizing agent affords the advantage that by this process no foreign matter is brought into the asbestos, which matter could in the further technical use of the latter become a danger in some way.

As the pyrite is present in the asbestos in small amounts only, also the quantity of the substances formed by the oxidizing process from the pyrite is very small. The final products of this reaction (ferric oxide sulphate and, on account of the neutralization of the sulphuric acid simultaneously formed, sulphates formed by the basic matter always present in asbestos) are, as subsequent experiments have evidenced, absolutely harmless in the asbestos in its use referred to, and moreover per se existent by nature in the asbestos untreated.

An asbestos treated by this method therefore does not contain any components attacking the metal and thus meets the requirements of industry.

*Example*

200 grams of asbestos contaminated with pyrite are put into a beaker and brought with the latter into an autoclave of 1.5 litre capacity; the bottom of the autoclave is covered with 100 c. c. of water. After the autoclave having been closed it is filled with oxygen or compressed air having a pressure of 12 atmospheres and then heated up to 165° C. for 24 hours. This time having elapsed the whole is allowed to cool down and subsequently the pressure is removed.

The asbestos so treated is now free from any trace of pyrite but unchanged as to its other properties. What is claimed as new, is—

1. The herein-described method of purifying asbestos, which consists in subjecting the asbestos to the action of compressed air in the presence of steam and at a high temperature, so as to effect a complete oxidation of any pyrite that may be present in the asbestos as an impurity.

2. The herein-described method of purifying asbestos, which consists in subjecting the asbestos to the action of compressed oxygen in the presence of steam and at a high temperature, so as to effect a complete oxidation of any pyrite that may be present in the asbestos as an impurity.

3. The herein-described method of purifying asbestos to eliminate pyrite impurities therefrom, which consists in subjecting the asbestos to the action of a compressed oxygen-containing gas in the presence of steam and at a high temperature, the gas being compressed to about twelve atmospheres and the temperature being about 165° C.

ERNST SCHÜRMANN.
WILHELM ESCH.